(12) United States Patent
Shen et al.

(10) Patent No.: US 12,506,960 B2
(45) Date of Patent: Dec. 23, 2025

(54) LENS ADJUSTMENT METHOD, LENS CONTROL DEVICE, LENS ADJUSTMENT SYSTEM, AND MEDIUM

(71) Applicant: TILTA INC., Burbank, CA (US)

(72) Inventors: Shining Shen, Shenzhen (CN);
Wenping Zeng, Shenzhen (CN);
Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 38 days.

(21) Appl. No.: 18/388,521

(22) Filed: Nov. 9, 2023

(65) Prior Publication Data
US 2025/0030944 A1 Jan. 23, 2025

(30) Foreign Application Priority Data
Jul. 14, 2023 (CN) .......................... 202310871996.2

(51) Int. Cl.
*H04N 23/67* (2023.01)
*G02B 7/08* (2021.01)

(52) U.S. Cl.
CPC ............... *H04N 23/67* (2023.01); *G02B 7/08* (2013.01)

(58) Field of Classification Search
CPC .................................. H04N 23/67; G02B 7/08
USPC ...................................................... 348/207.99
See application file for complete search history.

(56) References Cited

U.S. PATENT DOCUMENTS

2021/0352204 A1* 11/2021 Voss ........................ G03B 17/56

* cited by examiner

*Primary Examiner* — Joel W Fosselman
(74) *Attorney, Agent, or Firm* — LOZA & LOZA, LLP; Derek Yeung

(57) ABSTRACT

This disclosure pertains to the field of photography equipment technology, specifically addressing a method for adjusting lenses, a lens adjustment device, a lens adjustment system, and a computer medium. A driver component is used for controlling lens rotation. A method includes: controlling a driver component configured to adjust a parameter of a camera lens; obtaining information about a rotational position of the driver components; and rotating the camera lens using the driver component based on the information, thereby adjusting the parameter of the camera lens to a predetermined value. A lens control device can be used for the execution of lens parameter adjustment. By controlling the driver components, lens parameters are adjusted, eliminating the conventional method of manually rotating the camera lens while making adjustments.

15 Claims, 14 Drawing Sheets

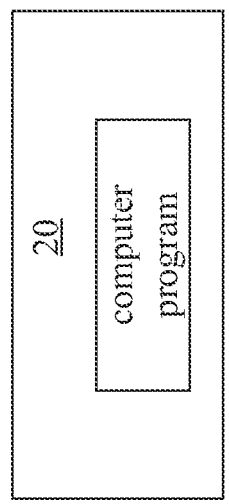

LENS ADJUSTMENT METHOD, LENS CONTROL DEVICE, LENS ADJUSTMENT SYSTEM, AND MEDIUM

CROSS-REFERENCE TO RELATED APPLICATIONS

The present Application for patent claims priority to and the benefit of pending Chinese Application No. 2023108719962, filed Jul. 14, 2023, and hereby expressly incorporated by reference herein as if fully set forth below in its entirety and for all applicable purposes.

TECHNICAL FIELD

The present disclosure relates to the technical field of photography equipment, particularly to a lens adjustment method, a lens control device, a lens adjustment system, and a computer-readable storage medium stored with executable code for lens adjustment and control.

INTRODUCTION

During a photography process, photographers can use different lens settings, such as focal length, focus, and/or aperture, for capturing various scenes. Camera lenses can be designed to rotate, allowing photographers to adjust these parameters by manually rotating the camera lens. While this method is convenient for stationary photography, it becomes cumbersome when photography equipment needs to move during shooting. Furthermore, some photography equipment can be heavy, making manual adjustments inefficient and inconvenient.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some aspects of one or more implementations in a form as a prelude to the more detailed description that is presented later.

Some aspects of the present invention provide a lens adjustment method, a lens control device, a lens adjustment system, and a computer-readable storage medium stored with executable code for lens control and adjustment.

To address the aforementioned technical challenges, the technical solution provided in this application is as follows:

This application provides a method for adjusting lenses, comprising: a driver component controlling the rotation of the camera lens, wherein the camera lens adjustment methods include:
 controlling a driver component configured to adjust a parameter of the camera lens.
 obtaining information about a rotational position of the driver components; and
 rotate the camera lens using the driver component based on the information, thereby adjusting the parameter of the camera lens to a predetermined value.

In some embodiments, there are multiple driver components, and controlling the driver components configured to adjust a parameter of the camera lens comprising:
 receiving identifiers corresponding to the driver components for each type of parameter adjustment; and
 when a manual signal is received, searching for multiple driver components within a single channel to control all driver components with identical identifiers in the same channel.

In some embodiments, there are multiple driver components, and controlling the driver components configured to adjust a parameter of the camera lens comprises:
 assigning an address to each of the driver components; and
 when an automatic signal is received, controlling the corresponding driver component through the assigned address.

In some embodiments, there are multiple driver components, and controlling the driver components configured to adjust a parameter of the camera lens comprising:
 verifying the selected driver component's identifier;
 if the identifier matches the driver component corresponding to the parameters to be adjusted, controlling the driver component's rotation; and
 if the identifier does not match the driver component corresponding to the parameters to be adjusted, changing the driver component's identifier to match the parameters to be adjusted.

In some embodiments, changing the driver component's identifier to match the parameters to be adjusted when the identifier does not match further comprises:
 reading a key for the driver component; and
 modifying the selected driver component's identifier to match the parameters to be adjusted based on the key.

In some embodiments, the driver components include multiple signal channels corresponding to different identifiers, and changing the driver component's identifier to match the parameters to be adjusted when the identifier does not match further comprises:
 modifying the signal based on the driver component's identifier to lower the electrical level in the corresponding channel.

In some embodiments, the driver components further comprising, before obtaining information about the rotational positions required for the driver components and using this information to control the driver components to rotate the camera lens for adjusting the desired lens parameters:
 receiving calibration signals for a preset duration. Receiving position information corresponding to the starting point of the camera lens as related to the driver component's position. Recording the position as the origin; and
 receiving position information corresponding to the endpoint of the camera lens as related to the driver component's position. Recording the position as the endpoint.

In some embodiments, the driver components further comprising, before obtaining information about the rotational positions required for the driver components and using this information to control the driver components to rotate the camera lens for adjusting the desired lens parameters:
 when a signal selecting a single driver component is received within the preset duration of the calibration signal, controlling the selected driver component for calibration.

In some embodiments, the driver components further comprising, before obtaining information about the rotational positions required for the driver components and using this information to control the driver components to rotate the camera lens for adjusting the desired lens parameters:

receiving a table correlating the values of the parameters to be adjusted with the positions of the driver components;

based on the parameters to be adjusted, reading the corresponding rotational position information from the table; and controlling the driver components to rotate the camera lens based on the corresponding rotational position information.

In some embodiments, the method further comprises:

detecting a range selection signal and selecting a first position information; and detecting the range selection signal again and selecting a second position information.

Recording the range between the first position information and the second position information. Controlling the driver component to rotate within the recorded range.

In some embodiments, the method further comprises:

detecting a signal for magnifying the speed and sending a speed amplification signal to the driver component to control its rotation speed; and detecting a signal for reducing the speed and sending a speed reduction signal to the driver component to control its rotational precision.

This application also discloses a lens control device, comprising: a memory and one or more controllers.

The memory is used for storing at least one program.

The controller executes the camera lens parameter adjustment method as described through one or more of the programs.

In some embodiments, the camera lens control device further comprising a handwheel and a joystick, wherein the controller executes the camera lens parameter adjustment method as described in any one of claims 1-11 by sensing the rotation of the handwheel or the movement of the joystick.

This application also discloses a lens adjustment system, comprising a lens control device and at least one driver component, wherein the camera lens control device controls one or more of the driver components to execute the camera lens parameter adjustment method as described.

This application also discloses a computer-readable storage medium, comprising a computer program stored therein, wherein when the computer program is executed by a controller, it implements the method as described.

Benefits:

This application allows for the execution of lens parameter adjustment through a lens control device. By controlling the driver components, lens parameters are adjusted. In the embodiments, the conventional method of manually rotating the camera lens while making adjustments has been replaced. Operators can control the driving components through the camera lens control device, allowing for self-rotation and adjustment of lens parameters. This approach significantly reduces the physical effort required by technicians, enhances shooting efficiency, and makes photography more convenient.

BRIEF DESCRIPTION OF THE DRAWINGS

To further illustrate aspects of this disclosure, brief descriptions of the drawings that can be used in the embodiments are provided below. It should be noted that the drawings mentioned in the following description are merely some examples of the present application.

FIG. 14 is a schematic diagram of a computer-readable storage medium.

REFERENCE NUMERALS

Figure 1:
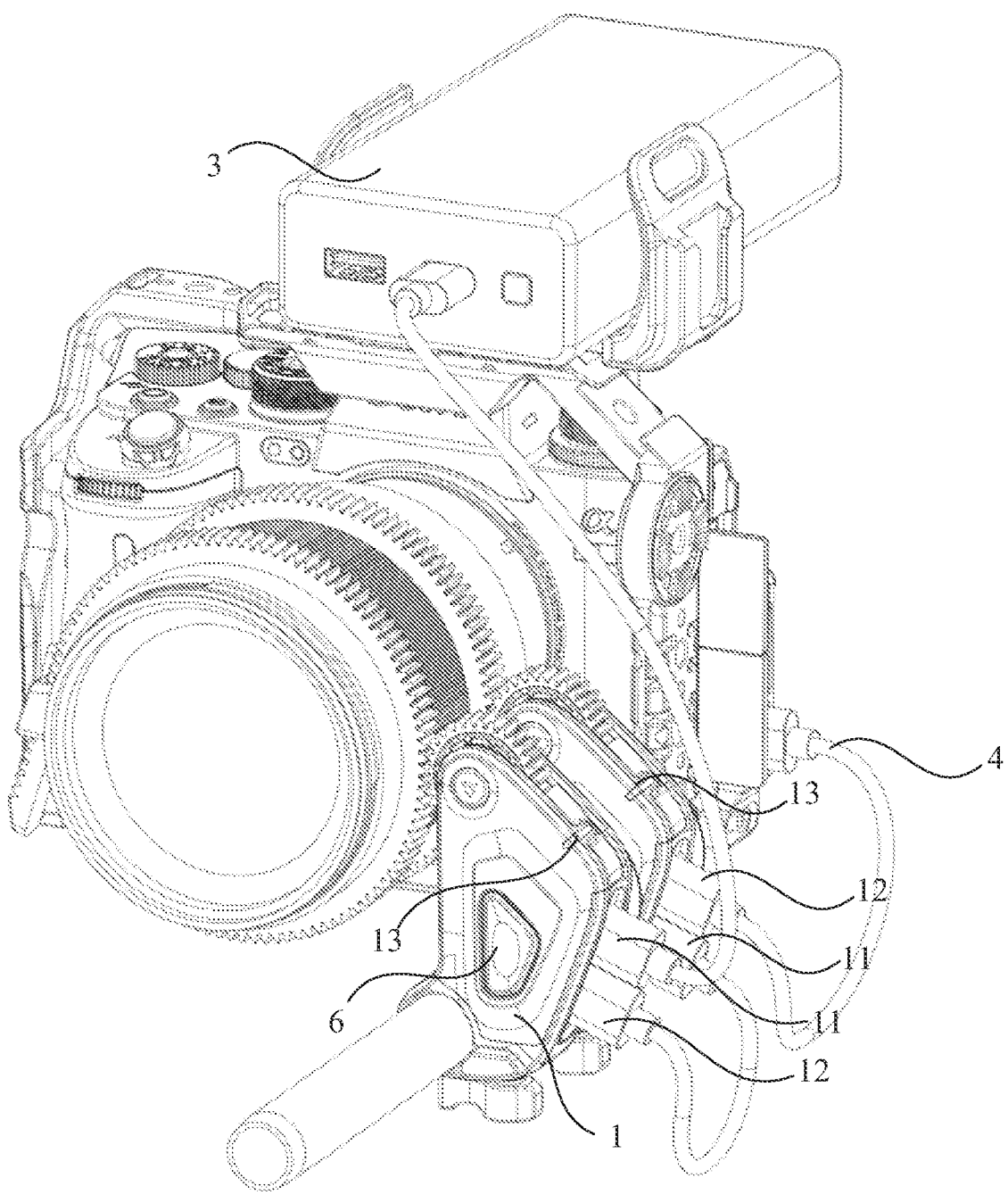
FIG. 1 is a schematic diagram of a structure in which multiple driver components are mounted on a camera according to one aspect of the present disclosure.
Figure 2:
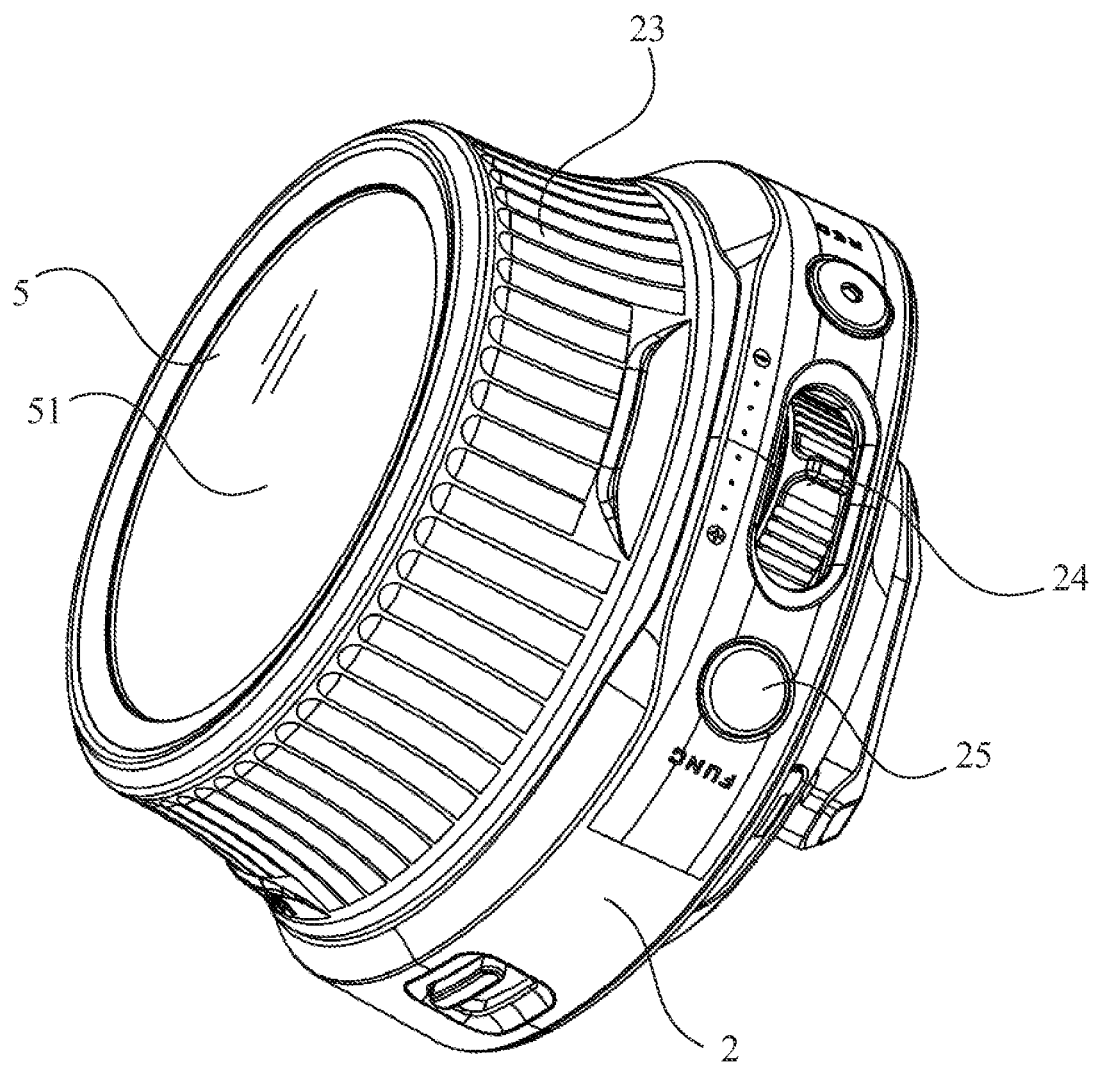
FIG. 2 is a schematic diagram of a lens control device according to one aspect of the present disclosure.

10—Camera lens adjustment system.
20—Computer-readable storage medium.
1—Driver component.
11—first interface.
12—second interface.
13—indicator.
2—Camera lens control device.
21—Controller.
22—Memory.
23—Handwheel.
24—joystick.
25—Function button.
3—Battery.
4—Recording cable.
5—Touchscreen.
51—Display area.
6—Button unit.

The realization, functional features, and aspects of the present disclosure will be further explained in combination with examples and with reference to the drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

The following detailed description of the examples of this disclosure is provided in conjunction with the accompanying drawings. It should be understood that these examples are merely a part of the embodiments of this application, not all of them. Based on the examples disclosed in this application, those skilled in the art can obtain other implementations without creative effort, all of which are within the scope of protection of this application.

It should be noted that all directional indications (such as up, down, left, right, front, rear, etc.) used in the examples of this disclosure are for explaining the relative positional relationship and motion between components under a specific posture (as shown in the drawings). When the specific posture changes, the directional indications also change accordingly.

Furthermore, in the description of the examples of this disclosure, descriptions such as "first," "second." etc. are for descriptive purposes only and should not be construed as indicating or implying the relative importance or quantity of the indicated technical features. Therefore, features labeled as "first" and "second" may include at least one of these features either explicitly or implicitly. Moreover, the term "and/or" in this entire specification encompasses three scenarios, using A and/or B as an example: it includes A, B, and both A and B meeting the technical scheme. Additionally, the technical solutions among different embodiments can be combined, but it must be based on the premise that those skilled in the art can achieve it. When the combination of technical solutions results in mutual contradictions or is impractical, such a combination should be considered nonexistent and is not within the scope of protection of this application.

Referring to FIGS. 1, 2, 12, 13, and 14, the present disclosure provides a camera lens adjustment system 10 for adjusting camera lens parameters. The camera lens adjustment system 10 includes a lens control device 2 and at least one driver component 1 (two examples shown in FIGS. 1 and 13). The camera lens control device 2 can be wirelessly connected to the driver component 1, for example, through a wireless channel (e.g., 2.4 GHz wireless channel). In other examples, the wireless channel can utilize any frequency suitable for controlling the driver component 1. In one aspect, a lens control device 2 can wirelessly connect to multiple driver components 1 to adjust different camera lens parameters. For example, each driver component can control a different camera parameter (e.g., focus, aperture, focal length, etc.)

The driver component 1 engages with a camera lens parameter adjustment ring to adjust camera parameters. The photography equipment can include various models of cameras, camcorders, or specialized film cameras. The driver component 1 can connect to the camera through various interfaces used for power supply and/or communication, such as a Universal Serial Bus (USB) connection or interface. When multiple driver components 1 are used, external power (e.g., battery 3) can be used to supply power to them. The driver component 1 can be equipped with a first interface 11 and a second interface 12. When multiple driver components 1 are used simultaneously, they can be connected in series through interfaces (e.g., USB interfaces) for synchronized power supply. For example, the first interface 13 can serve as input, the second interface 12 can output in sequence, with the first interface 11 connected to an external power source 3 and the second interface 12 connected to the first interface 11 of the next driver component 1. The first interface 11 is connected to the second interface 12 of the previous/next driver component 1 for power supply or communication when the last driver component 1 is in operation, and the second interface 12 connects to the recording cable 4. The other end of the recording cable 4 connects to the camera, enabling communication between the camera and the driver component(s) 1. Through the camera lens control device 2, camera recording functions and parameters can be controlled.

In some aspects, the camera lens control device 2 can wirelessly connect to and communicate with the camera. For example, the camera lens control device 2 can include a touchscreen 5 with a display area 51. The display area 51 can show various camera parameters, such as a camera control interface, which includes recording/standby indicators, aperture parameter information, sensitivity parameter information, camera communication protocols, and shutter parameter information. It can also display motor parameter interfaces, such as motor indicators, including focus motor, zoom motor, and aperture motor. When the camera lens control device 2 controls a specific motor, the motor's electrical angle changes in real-time with adjustments. Additionally, a focus distance interface can be displayed, including focus values, lens models, and lens brands.

In some aspects, the camera lens control device 2 includes a memory 22 and one or more controllers 21. The memory 22 can store at least one or more programs. The camera lens control device 2 can also include a handwheel 23 and a joystick 24. When the controller 21 senses the rotation of the handwheel 23 or the movement of the joystick 24, it can execute a parameter adjustment method through one or more programs, thereby controlling lens parameter adjustments. For example, one or more programs can be stored on computer-readable storage media 20, and when executed by the controller 21, they can implement the camera lens parameter adjustment method. The technical solutions of the present disclosure, in whole or in part, can be embodied in the form of software products, stored in computer-readable storage media, including at least one instruction for causing at least one network device to execute the methods disclosed in the various embodiments of the present disclosure. Storage media can include USB drives, hard drives, solid state storages, and various media capable of storing program code.

Figure 3:
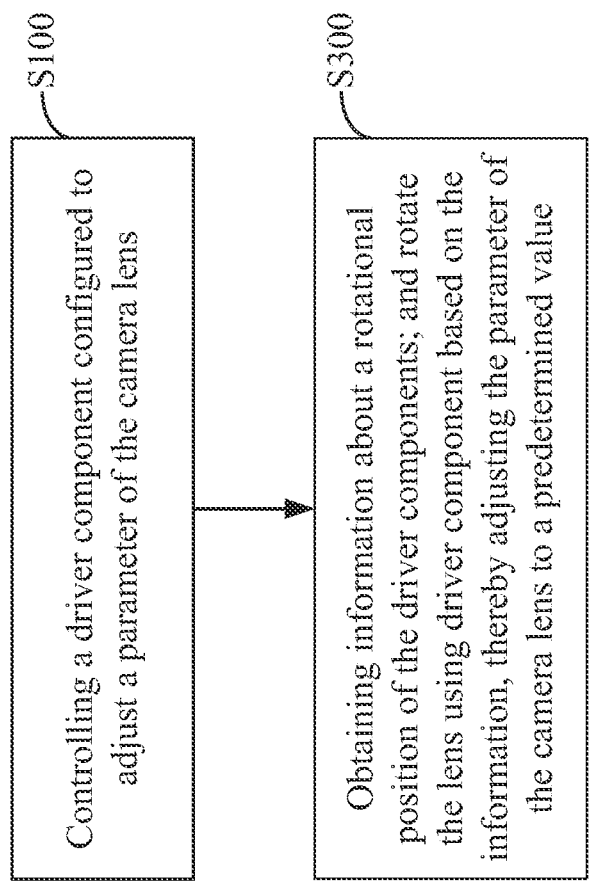
FIG. 3 is a flowchart of an exemplary lens adjustment method according to one aspect of the present disclosure.

FIG. 3 illustrates a flow chart of a camera lens parameter adjustment method in the present application includes:

S100, controlling a driver component 1 configured to adjust a parameter of the camera lens.

In this embodiment, a user can use one or more driver components 1. The parameters to be adjusted in this embodiment can include focus, focal length, and/or aperture, corresponding to a focus driver component 1, a focal length driver component 1, and/or an aperture driver component 1, respectively. These driver components 1 engage with the focus ring, focal length ring, and aperture ring on the camera lens, respectively, allowing control of the driver component corresponding to parameters to be adjusted. For instance, if focus adjustment is needed, the focus driver component 1 can be matched to control the focus of the lens. It's worth noting that, in this embodiment, settings for parameters other than focus, focal length, or aperture can be provided for user personalization.

For example, in the display area 51 of the camera lens control device 2, one can select the driver component 1 identifier corresponding to the parameters to be adjusted. The controller 21 of the camera lens control device 2 receives the corresponding driver component 1 identifier information and controls the driver component 1 with that identifier.

At S300, the lens control device 2 obtains information about a rotational position needed for the driver component 1 and rotate the camera lens using the driver component 1 based on the information to control the driver component 1, which, in turn, rotates the lens, thereby adjusting the parameter of the camera lens to a predetermined value.

For a certain type of parameter, the driver component 1 has different positions, and the camera lens parameters also may vary. For example, in the case of focus, when the focus driver component 1 rotates to different positions, the corresponding focus points differ. Therefore, when the camera lens control device 2 receives rotation position information (desired electrical angle to rotate), it sends this information (electrical angle) to the driver component 1 (motor), and the driver component 1 rotates by the corresponding angle to achieve the desired focus set by the user. In this case, the controller of the lens control device 21 can obtain the electrical angle to be rotated through the rotation of the handwheel 23 or the movement of the joystick 24 and send this electrical angle to the focus driver component 1 for controlling the corresponding driver component 1.

In some aspects, the camera lens control device 2 can execute the aforementioned lens parameter adjustment method to control the corresponding driver component 1 to rotate the lens or a lens adjustment ring of the camera lens, thereby adjusting the desired camera lens parameters. In this disclosure, the method of adjusting lens parameters by manually rotating the camera lens (e.g., an adjustment ring of the lens) while moving can be avoided. An operator or user of the camera can control the driving component 1 through the camera lens control device 2, allowing for self-rotation and adjustment of lens parameters. This approach significantly reduces the physical effort required by the user, enhances shooting efficiency, and makes photography more convenient.

In some aspects, before using the driver components 1 to adjust the parameters of the camera lens, there can be a pairing process involving the camera lens control device 2 and all driver components 1. The camera lens control device 2 and the driver components 1 can be wirelessly or wiredly connected, and after pairing, the camera lens control device 2 can automatically assigns identifiers to all driver components 1. This ensures that, in the camera lens adjustment method of this disclosure, the driver component 1 corresponding to the parameters to be adjusted of the camera lens can be matched. For example, for adjusting the camera lens focus, a user can select the identifier corresponding to the focus driver component 1 in the display area 51 of the camera lens control device 2. The controller 21 of the camera lens control device 2 receives the signal when the focus driver component 1 is selected and matches the selected focus driver component 1.

Figure 4:
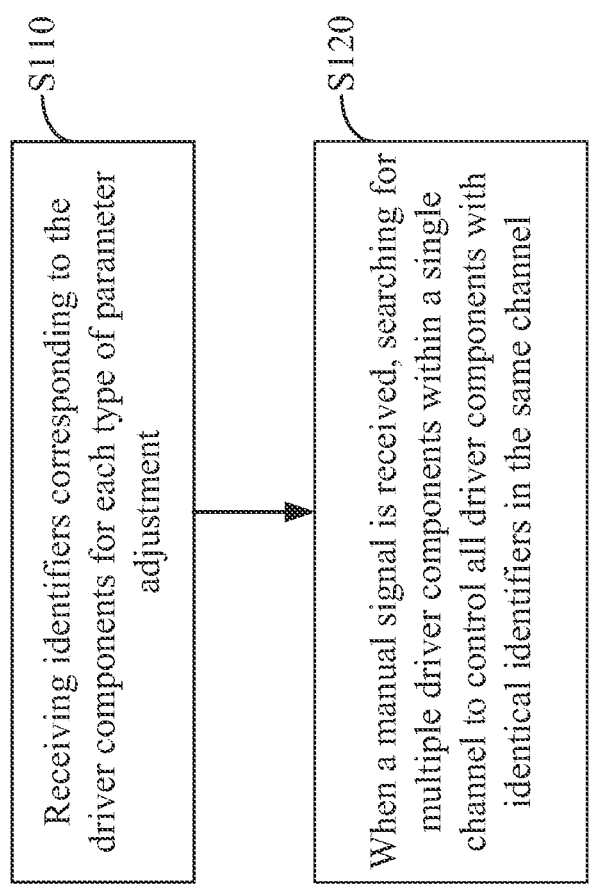
FIG. 4 is a flowchart of an exemplary driver component control process according to one aspect of the present disclosure.

FIG. 4 illustrate a flow chart for an exemplary pairing process of multiple driver components 1 corresponding to the lens parameters to be adjusted of the camera lens includes:

S110, receiving the identifiers corresponding to each type of parameter adjustment for the driver component 1.

In this example, for ease of control, the camera lens control device 2 can assign different identifiers to different driver components 1. For example, the focus driver component 1 can be assigned identifier 1, the focal length driver component 1 can be assigned with identifier 2, the aperture driver component 1 can be assigned with identifier 3, and other parameter driver components 1 can be assigned with identifier 4.

In another example, the indication of each driver component 1, such as an LED indicator 13, can be used to distinguish different driver components 1. For example, the focus driver component 1 can have a purple indicator 13, the focal length component 1 indicator 13 can have a blue indicator 13, and the aperture driver component 1 can have a green indicator 13. These indicator 13 settings can be implemented through suitable circuitry. With these settings, the controller 21 of the camera lens control device 2 can determine the motor's identifier based on the color of the indicator 13 light signal it receives, or a user can identify the motor identifier based on the displayed indicator 13 color on the driver component 1. The motor can be a part of the driver component 1.

S120, when a manual signal is received, the lens control device 2 can search for multiple driver components 1 within a single channel (e.g., a communication channel) to control those with the same identifier in the same channel.

In one example, when a manual signal is received, multiple driver components 1 that need identifying are searched within a single channel to match all driver components 1 with the same identifier within that channel. For example, in communication channel 4, the camera lens control device 2 can search for all driver components, which control all focus driver components. With this setup, multiple cameras can be adjusted for focus simultaneously, saving photographer time and improving efficiency. In one example, the camera lens control device 2 can have 14 communication channels for use. When the user selects a manual pairing through the display area 51 of the camera lens control device 2, the camera lens control device 2 receives a manual signal. In manual pairing, the camera lens control device 2 and the driver component 1 are configured to be at the same preset frequency (e.g., at the same HZ, e.g. 2480 HZ), the driver component 1 can receives a packet from the camera lens control device 2. In this example, the packet includes channel information at least.

Figure 5:
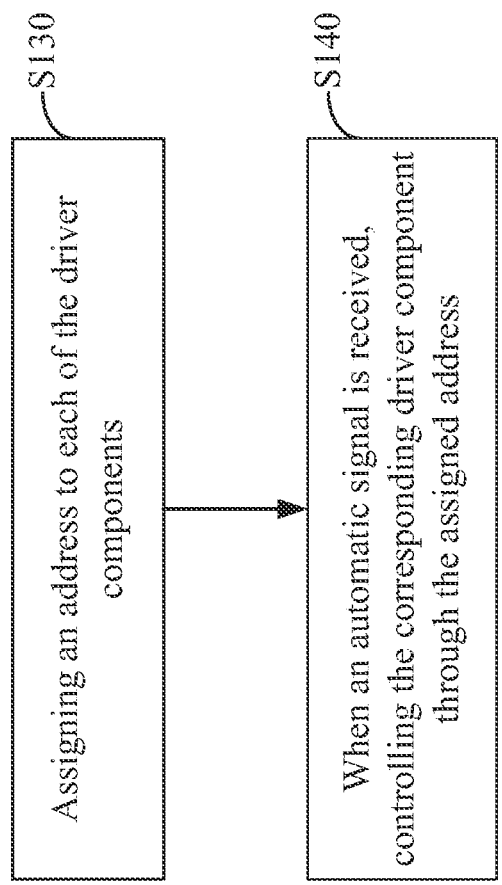
FIG. 5 is a flowchart of another exemplary driver component control process according to one aspect of the present disclosure.

FIG. 5 illustrates a process of matching the driver component 1 corresponding to the parameters to be adjusted of the camera lens, the process including:

S130, assigning an address to each driver component 1.

In this example, specifically, the address is referred to as the PAN ID. The camera lens control device 2 has multiple PAN IDs, and each driver component 1 has a different PAN ID. The camera lens control device 2 can match the selected driver component 1 by comparing the PAN ID.

S140, when an automatic signal is received, controlling the corresponding driver component 1 based on the address (e.g., PAN ID). An automatic signal may use auto-verification to verify the address.

In one example, specifically, when the PAN ID address of the camera lens control device 2 matches the PAN ID address of the selected driver component 1, they are paired and matched. This automatic pairing mode pairs with a specific driver component 1. With this setup, when adjusting a specific camera lens parameter, a user can use the automatic mode to adjust the camera lens parameter. When the user selects a automatic pairing through the display area 51 of the camera lens control device 2, the camera lens control device 2 receives a automatic signal. In automatic pairing, the camera lens control device 2 and the driver component 1 are configured to be at the same preset frequency (e.g., at the same HZ, e.g. 2480 HZ), the driver component 1 can receives a packet from the camera lens control device 2. In this example, the packet includes channel information and address information at least. At this time, the camera lens control device 2 and the driver component 1 can not be directly paired, requiring same address for pairing to avoid interference from other devices.

Figure 6:
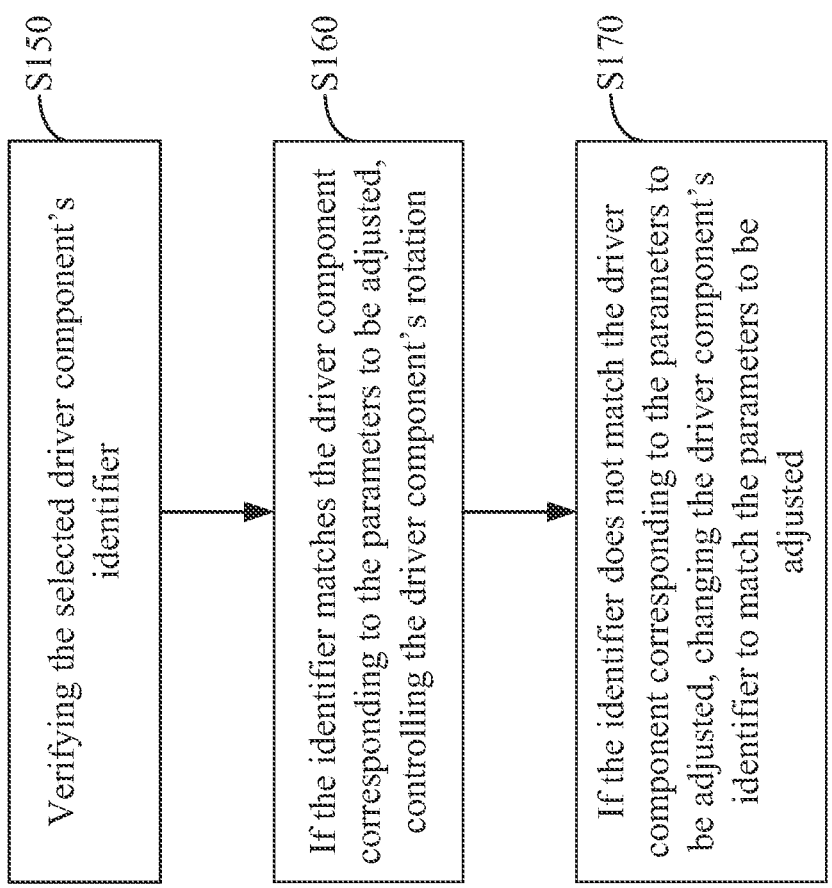
FIG. 6 is a flowchart of an exemplary driver component verification process according to one aspect of the present disclosure.
Figure 7:
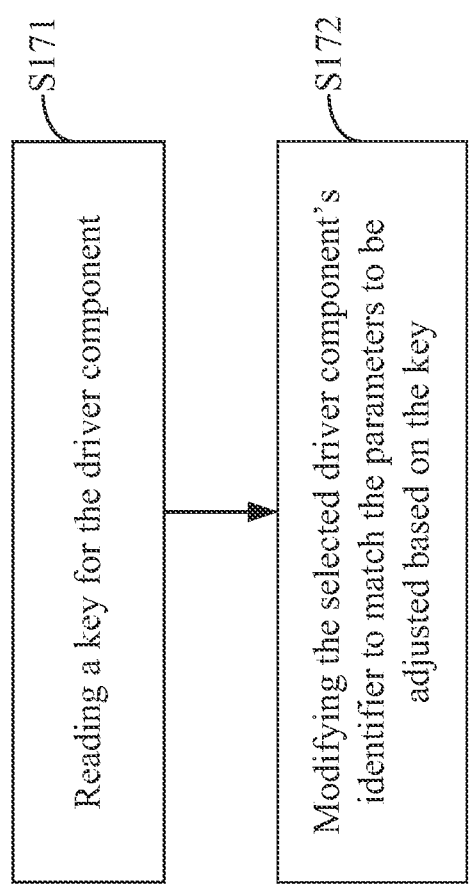
FIG. 7 is a flowchart of an exemplary driver component identifier change process according to one aspect of the present disclosure.

FIG. 6 is a flow chart illustrating a process of matching the driver component 1 corresponding to the parameters to be adjusted of the camera lens. The process includes:

S150, verifying the selected driver component 1 identifier.

In this control method, a user can install the driver component 1 on the photography equipment in advance and then control the driver component 1 through the camera lens control device 2. In one example, the camera lens can have a focus control ring, a focal length control ring, and an aperture control ring, and their corresponding positions have a focus driver component 1, a focal length driver component 1, and an aperture driver component 1 installed. During operation, it is possible for users to install the driver components 1 in the wrong positions, such as installing the focus driver component 1 on the focal length ring and engaging it with the focal length ring. Alternatively, users may inadvertently match the wrong driver component 1. For example, if a user want to adjust the focus, but the user mistakenly matches the focal length driver component 1. These situations can lead to misalignment or mismatch between the lens parameters to be adjusted of the camera lens and the driver component 1. In such cases, the controller 21 can issue a reminder or warning when the camera lens control device 2 detects that the change in camera parameters does not match the selected driver component 1. For example, if the user wants to adjust the focus parameter and selects the focus driver component 1 through the display area 51 of the camera lens control device 2 to match, referring to FIG. 6, but the camera lens control device 2 receives a signal indicating an aperture change, it can issue a reminder/warning to the user.

At S160, if the identifier of the driver component 1 corresponding to the desired adjustment parameter matches, the camera lens control device 2 can control the driver component 1 to rotate.

At S170, if the identifier of the driver component 1 corresponding to the desired adjustment parameter does not match, the camera lens control device 2 can change the identifier of the driver component 1 to match the desired adjustment parameter.

In this example, after changing the driver component 1 identifier, the user does not need to remove the incorrectly identified driver component 1 or reinstall the driver component 1 corresponding to the desired adjustment parameter to the removed position. It improves the shooting efficiency. Furthermore, if the identifier of the driver component 1 does not match the desired adjustment parameter, the user can change the driver component 1 identifier to match the desired adjustment parameter.

Referring to 7, at S171, the lens control device 2 can read the key (e.g., a digital key or code) of the driver component 1.

In this example, each driver component 1 initially has its own key, which serves as a unique identifier for each driver component 1. When it is necessary to change the identifier of a driver component 1, the camera lens control device 2 can read the key of the selected driver component 1. In this example, all the sequence identity identifiers of the driver components 1 in use can be stored in the memory 22 of the camera lens control device 2. These identifiers, for example, can be entered manually by the user or downloaded from a server.

At S172, based on the key, the lens control device 2 can change the identifier of the selected driver component 1 to match the desired adjustment parameter. In this example, after the camera lens control device 2 accesses the sequence identity identifiers, it can change the identifier of the driver component 1 from the old identifier to the new identifier corresponding to the desired adjustment parameter. With this setup, the user does not need to disassemble the incorrectly identified driver component 1 or reinstall the driver component 1 corresponding to the desired adjustment parameter to the removed position. It improves the shooting efficiency.

In another example where the driver component 1 includes multiple signal channels corresponding to different identifiers, if the identifier of the driver component 1 corresponding to the desired adjustment parameter does not match, the camera lens control device 2 can change the identifier of the driver component 1 to match the desired adjustment parameter.

For example, the lens control device 2 can change the signal based on the driver component 1 identifier to pull down the electrical level of the channel corresponding to the selected identifier. Specifically, in this example, each driver component 1 can have multiple signal channels, and the level corresponds to an electrical signal. A low level indicates that the signal channel is connected, while a high level indicates that the signal channel is not connected. Therefore, when the identifier change signal is received, the driver component 1 can pull down the level of the signal channel corresponding to the correct identifier. In this example, the camera lens control device 2 can be wirelessly connected to the driver components 1, allowing it to send the correct identifier information to the driver component 1 and lower the level of the signal channel corresponding to the correct identifier.

In another example, the driver component 1 can change its own identifier independently. Specifically, the driver component 1 can include a button (or keypad) unit 6. When the button unit 6 is pressed, the driver component 1's processor can receive an identifier change signal. Depending on the arrangement of signal channels, it can lower the level of the next sequential signal channel. For example, if there are three universal signal channels, with channels 1, 2, and 3 corresponding to a driver component 1 with an identifier 1 (e.g., representing focus, color: purple), a driver component 1 with an identifier 2 (e.g., representing focus distance, color: blue), and a driver component 1 with an identifier 3 (e.g., representing aperture, color: green) respectively. For example, the indicator 13 light of the driver component 1 before receiving an identifier change signal is purple, when the user presses the button unit, so that the driver component 1 receives the identifier change signal, the driver component 1 is switched from identifier 1 to identifier 2, as driver component 1's processor can lower the level of channel 2.

Figure 8:
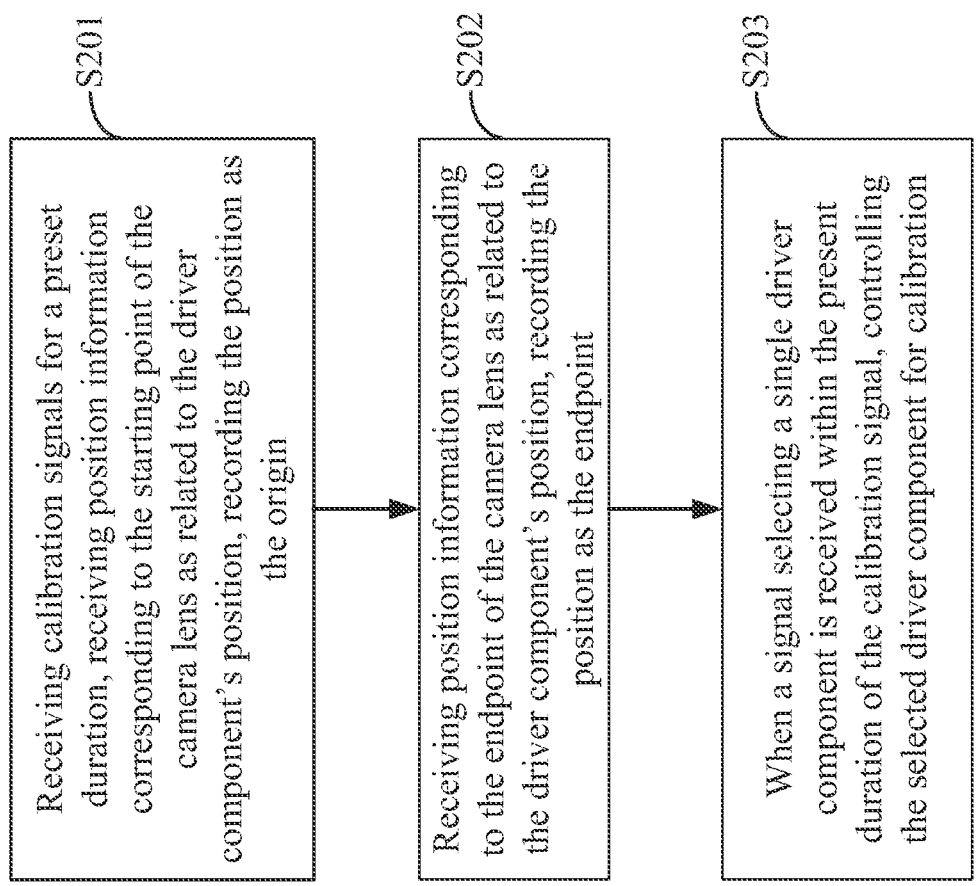
FIG. 8 is a flowchart of an exemplary stroke calibration process according to one aspect of the present disclosure.

FIG. 8 is a flow chart illustrating the camera lens adjustment method that, before obtaining information about the rotational positions required for the driver component 1 and using this information to control the driver component 1 to rotate the camera lens for adjusting the desired lens parameters, further comprises:

S201, upon receiving calibration signals for a preset duration, the lens control device 2 receiving position information corresponding to the starting point of the camera lens as related to the driver component 1's position. The camera lens control device 2 can record the position as the origin.

In this example, the camera lens control device 2 can be equipped with one or more function buttons 25. When a function button 25 is held for a preset duration and the camera lens control device's controller 21 receives a calibration signal during this time, it initiates the automatic calibration of all paired driver components 1. Initially, the camera lens control device 2 needs to determine the camera lens's starting point (or position) and record it as the origin. In one example, in an automatic mode, the controller 21 of the camera lens control device 2 can send a calibration signal to the driver component 1. When the driver component 1 receives the calibration signal, it controls the camera lens to rotate to the original or starting position. At this point, the controller 21 of the camera lens control device 2 records the position information of the driver component 1 as the origin, with the electrical angle at this point set to 0. In another example, a manual mode can also be used, for example for lenses without limits. In the manual mode, the user can manually rotate the camera lens to the starting position, click on the starting position in the display area 51 of the camera lens control device 2, and confirm it. The controller 21 of the camera lens control device 2 then records the position of the camera lens corresponding to the starting point as the origin, with the electrical angle at this point set to 0. In one example, the preset duration can be 3 seconds.

At S202, the camera lens control device 2 can receive the position information of the selected driver component 1 corresponding to the camera lens's endpoint position and record it as the endpoint.

In this example, in automatic mode, the driver component 1 controls the camera lens to rotate to the endpoint limit position. At this point, the controller 21 of the camera lens control device 2 records the position information of the driver component 1 as the endpoint, and the electrical angle at this point is recorded as X. In one example, the endpoint for the electrical angle can be set to 900, and the electrical angle range in this embodiment is from 0 to 900. In another example, determining the endpoint can also be done manually. For example, the user can manually rotate the camera lens to the endpoint position, click on the endpoint position in the display area 51 of the camera lens control device 2, and confirm it. The controller 21 of the camera lens control device 2 receives the endpoint information, and then records the position information of the driver component 1 corresponding to the endpoint of the camera lens as the endpoint, and the electrical angle at this point is recorded as X. In this example, the endpoint for the electrical angle is set to 900.

In the aforementioned automatic mode and manual mode, each driver component 1 is installed on the camera lens, and when the camera lens rotates, the driver component 1 (e.g., a wheel for controlling the camera lens) also rotates, or when the driver component 1 (e.g., a wheel for controlling the camera lens) rotates, the camera lens also rotates. Therefore, the range between the origin and endpoint of the camera lens corresponds to the range of electrical angles on the driver component 1.

In some example, the camera lens adjustment method, further comprising, before obtaining information about the rotational positions required for the driver component 1 and using this information to control the driver component 1 to rotate the camera lens for adjusting the desired lens parameters:

S203, the lens control device 2 can control the selected driver component 1 for calibration when a selection signal from that driver component 1 is received within the preset duration for calibration signal.

In this example, the camera lens control device 2 and all driver components 1 are paired. Through the display area 51 of the camera lens control device 2, one can choose to calibrate either all of the driver components 1 or a specific one of them with an identifier. For example, a user can only select driver component 1, specifically the focus driver component 1. The camera lens control device's controller 21 receives stroke of the calibration focus driver component 1 at this point. When the function button 25 is held down for a predetermined amount of time, the camera lens controller 21 defaults to calibrating all driver 1 components paired with the camera lens control. At this time, the camera lens control device's controller 21 can control the calibration of all driver components 1. However, if the user needs to recalibrate a specific driver component 1 during operation, the user can select the designated driver component 1 on the camera lens control device 2 display within the preset duration of pressing the functional button. For example, by selecting the focus driver component 1, the controller 21 of lens control device 2 receives a signal selecting driver component 1. The controller 21 then sends a calibration signal to the selected focus driver component 1, which initiates automatic calibration.

Figure 9:
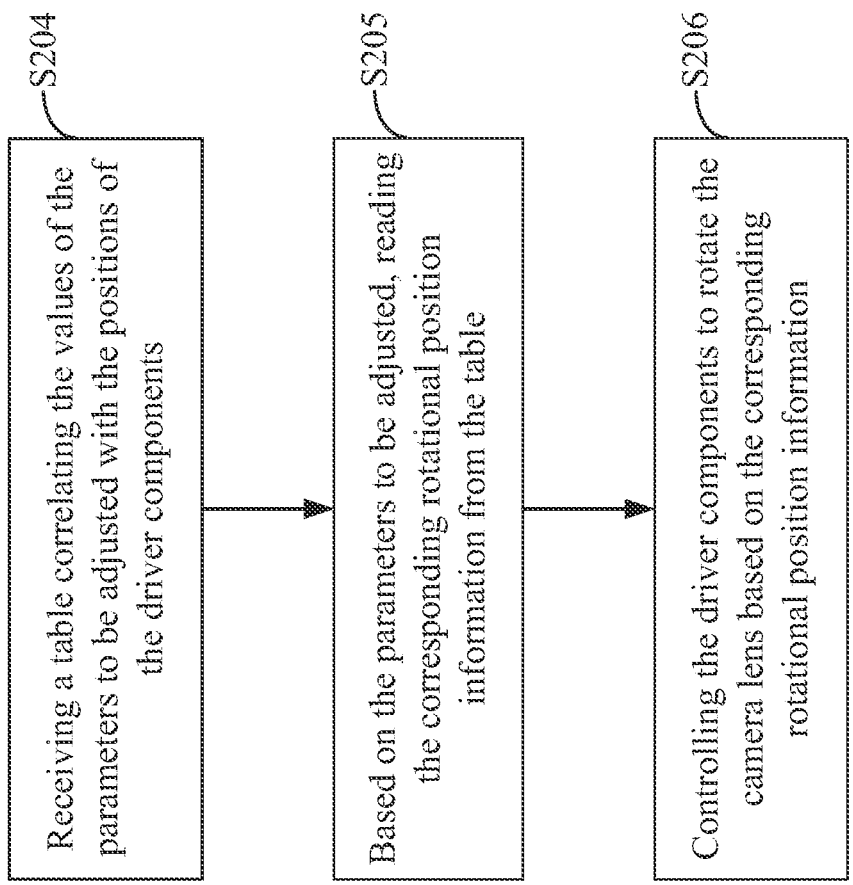
FIG. 9 is a flowchart of an exemplary lens adjustment method according to one aspect of the present disclosure.

Referring to FIG. 9, in this example, the camera lens adjustment method, further comprising, before obtaining information about the rotational positions required for the driver component 1 and using this information to control the driver component 1 to rotate the camera lens for adjusting the desired lens parameters:

S204, receiving a one-to-one correspondence table between the values of the parameters to be adjusted and the rotational position information of the driver component 1.

In this example, this table allows the user to understand the parameter information corresponding to each electrical angle. For example, it can be aided by a lens scale; align the camera lens scale with the reference scale, then test by rotating the driver component 1 to determine the electrical angle and parameter value corresponding to each scale value. This way, the user can find out how many electrical angles the driver component 1 needs to rotate to reach a desired parameter value. In one example, the obtained table can be stored on a server, and the controller 21 of the camera lens control device 2 can retrieve it from a server. Alternatively, the user can directly upload (e.g., using a wireless or wired data connection) the table generated from test data to the memory 22 of the camera lens control device 2, allowing the controller 21 of the camera lens control device 2 to access the table.

S205, based on the parameters to be adjusted, the lens control device 2 can read the corresponding rotational position information from the table.

Depending on the parameter type to be adjusted, the controller 21 for lens control device 2 has the ability to read the rotation position information corresponding to preset adjustment parameters from the corresponding table. For instance, when adjusting to a preset focus value such as Focus 4.0, the controller 21 of the camera lens control device 2 receives the preset focus value and subsequently retrieves the related electrical angle.

S206, based on the corresponding rotational position information, the camera lens control device 2 can control the driver component 1 to rotate the camera lens.

The controller 21 of the camera lens control device 2 can control the driver component 1 to rotate based on the corresponding electrical angle. In this example, the user can control the rotation of driver component 1 by rotating a handwheel 23 or moving a joystick 24. When the controller 21 of the camera lens control device 2 receives signals indicating handwheel 23 rotation or joystick 24 movement, it can control the driver component 1 accordingly. The corresponding electrical angle and focus information can be displayed in the display area 51 of the camera lens control device 2.

Furthermore, in some examples, the user can control the adjustment of two parameters by selecting two driver components 1 via a handwheel 23 and a joystick 24. This includes:

Controlling the two driver components 1 corresponding to the two parameters to be adjusted; and Obtaining the rotational position information required by the two driver components and controlling them correspondingly to adjust the two parameters of the camera lens.

In this example, the user can use the handwheel 23 rotation, for example, to control the aperture and the joystick 24 to control the focus. The controller 21 of the camera lens control device 2 can receive the rotation information from the handwheel 23 and send the angle to the aperture driver component 1. Simultaneously, it can receive the required electrical angle for focus adjustment from the joystick 24 and send it to the focus driver component 1 to adjust the camera lens's focus parameter.

Figure 10:
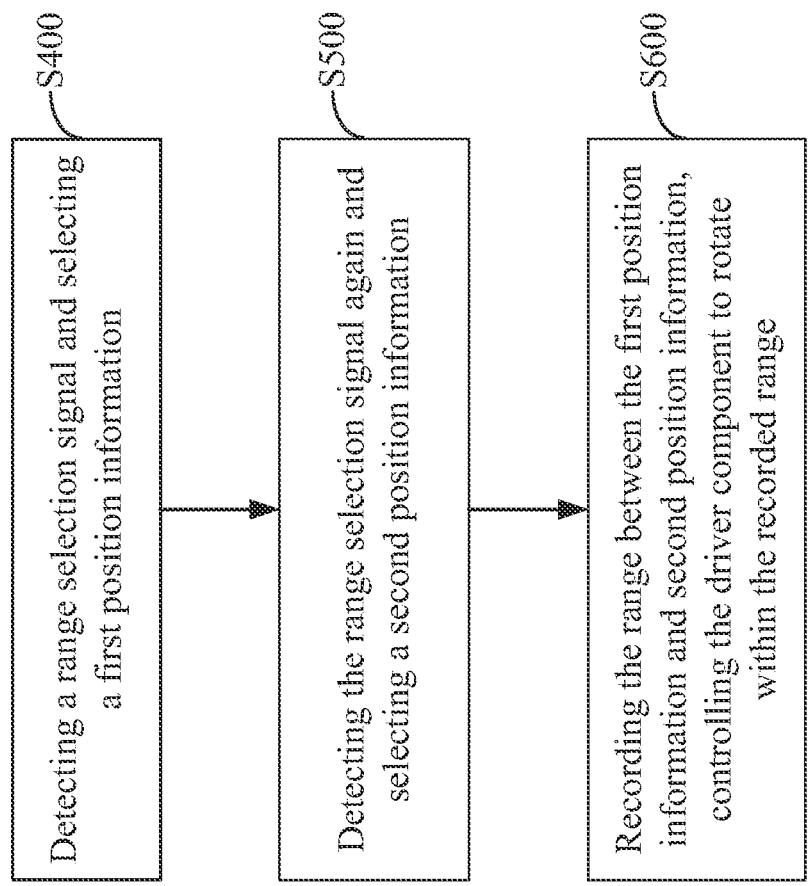
FIG. 10 is a flowchart of an exemplary range selection process according to one aspect of the present disclosure.

Referring to FIG. 10, in some examples, the camera lens adjustment method further includes:

S400, detecting a range selection signal and selecting a first position information.

In this example, the user can preset the duration by long pressing the selected icon on the touchscreen display of the camera lens control device 2. The controller 21 of the camera lens control device 2 receives a range selection signal and sets the current position information as the first position information. For example, the preset duration can be 2 seconds. In some examples, the preset duration can have other values (e.g., 3, 4, or 5 seconds).

S500, when a range selection signal is detected again, the camera lens control device 2 can select the second position information.

In this example, the user can rotate the handwheel 23 and then select (e.g., click on) the selection icon in the display area 51 of the touchscreen 5 of the camera lens control device 2. The controller 21 of the camera lens control device 2 can receive the range selection signal again and set the current position information as the second position information.

S600, the lens control device 2 can record the range between the first position information and the second position information, and control the driver component 1 to rotate within this range.

In this example, the controller 21 sets the range between the first position information and the second position information as the selected range, allowing driver component 1 to rotate within this range. This is useful when photographers need to make adjustments within a certain parameter range, improving their efficiency.

In this example, the lens control device 2 can use marking information. A user can select (e.g., clicking on) the mark icon in the display area 51 of the touchscreen 5 of the camera lens control device 2, the controller 21 can receive a mark signal and set the current lens position as a marked point. In some examples, multiple marked points can be set to remind photographers. In another example, photographers may be interested in specific parameter points within a certain parameter range. In this case, selection of multiple marked points within the selected range can be used in consideration of the range selection signal to remind photographers.

In this example, the lens control device 2 can use a range selection cancel signal. After setting the range selection, the user can long-press the selection icon on the touchscreen 5 of the camera lens control device 2 for a preset duration. The controller 21 of the camera lens control device 2 can receive the range selection cancel signal, making the range selection invalid. The preset duration can be 2 seconds in this example.

Figure 11:
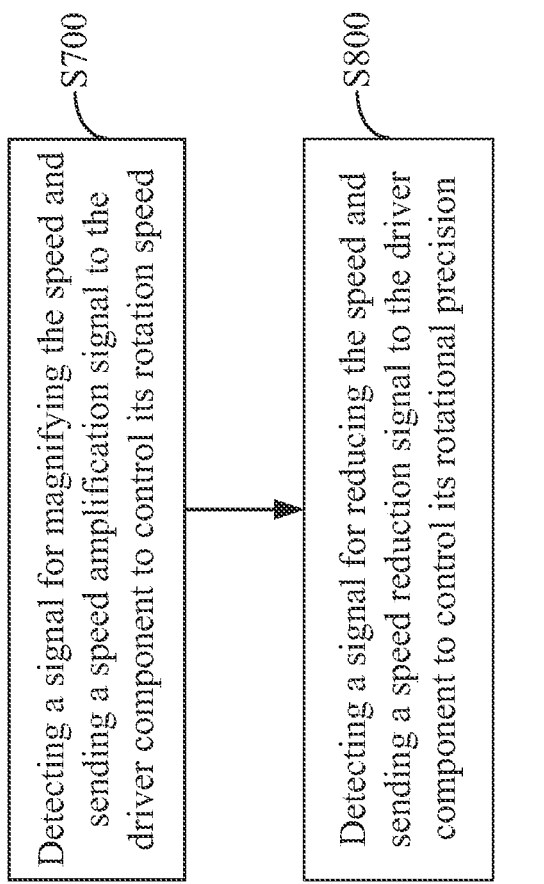
FIG. 11 is a flowchart of an exemplary speed control process according to one aspect of the present disclosure.
Figure 12:
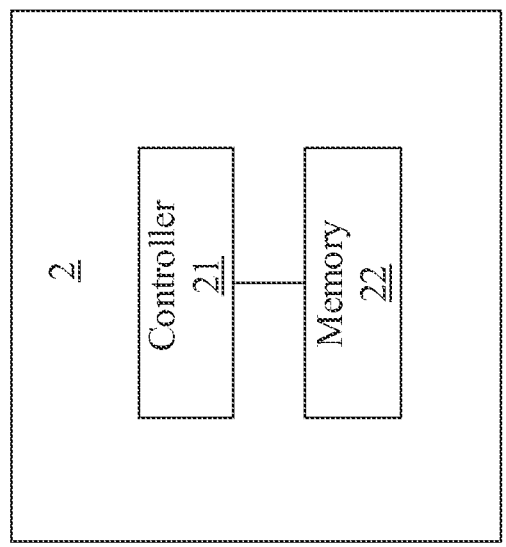
FIG. 12 is a schematic diagram of a camera lens control device.
Figure 13:
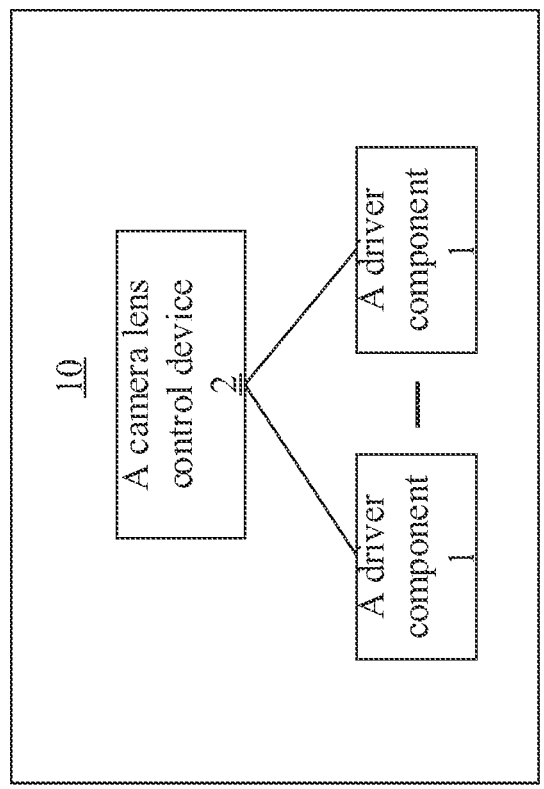
FIG. 13 is a schematic diagram of a camera lens adjustment system.

Referring to FIG. 11, in some examples, the camera lens adjustment method further includes:

S700, when a speed multiplier signal is detected, a speed multiplier signal to the driver component 1 to control its rotation speed.

In this example, the display area 51 of the touchscreen 5 of the camera lens control device 2 allows for multiple-speed amplification selection. Upon receipt of the multiple-speed amplification signal, the controller 21 increases the rotation sensitivity of the driver component 1, thus increasing rotation speed to assist in parameter adjustments during photography in terms of speed.

S800, when a speed reduction signal is detected, the lens control device 2 can send a speed reduction signal to driver component 1 to control its rotation precision.

In this example, the display area 51 of the touchscreen 5 of the camera lens control device 2 allows for multiple-speed reduction selection. Upon receipt of the multiple-speed reduction signal, the controller 21 reduces the rotation sensitivity of the driver component 1, thus increasing rotation precision to assist in parameter adjustments during photography in terms of precision.

In some examples, the camera lens control device 2 can be installed on a power handle to receive power from it. However, during installation, the camera lens control device 2 may be accidentally installed upside down, such as rotated 180°. This would also invert the screen display. Although the photographer can dismantle and reinstall the device, it will be time consuming. To address this, the camera lens control devices 2 can receive a screen rotation signal, and the controller 21 of the camera lens control device 2 can control the screen rotation. For example, the user can select the orientation setting in display area 51 of the touchscreen 5, and the controller 21 can receive the screen rotation signal accordingly.

In another example, different camera lens models may have varying degrees of friction when rotating. Some lenses may be tighter, making them harder to rotate, while others may be looser and easier to rotate. This results in differences in the force required to rotate the camera lens. Therefore, the camera lens control devices can receive a torque adjustment signal for the driver component 1. It can receive a signal to reduce the torque for the selected driver component 1 or increase it as needed. For example, when adjusting the torque of the focus driver component 1, the camera lens control device 2 selects the focus driver component 1. Subsequently, the camera lens control device 2 can receive a signal to increase the torque for the selected focus driver component 1 or decrease it. This setting allows for the adjustment of the output force of the driver component 1, avoiding situations where the camera lens rotates too quickly due to excessive torque when it's loose (in this case, the camera lens rotates too quickly and frequently fluctuates around the pre-set adjustment parameter values, resulting in difficulty achieving accurate parameter values) or where the driver component 1 lacks sufficient torque, causing increased motor load and potential damage when the camera lens is tight.

The above description represents exemplary embodiments of the disclosure and should not be viewed as limiting the scope of the disclosure. Equivalent structural transformations made using the contents of this specification and the attached drawings according to the application's concepts, directly or indirectly applied in other relevant technical fields, are also included in the scope of this application.

The above description represents preferred embodiments of the disclosure and should not be viewed as limiting the scope of the patent. Equivalent structural transformations made using the contents of this specification and the attached drawings according to the application's concepts, directly or indirectly applied in other relevant technical fields, are also included in the patent protection scope of this application. The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method for adjusting a camera lens, comprising
controlling a driver component configured to adjust a parameter of the camera lens;
receiving a calibration signal for calibrating the driver component;
receiving position information corresponding to a starting point of the camera lens as related to a first position of driver component;
recording the first position of driver component as an origin;
receiving position information corresponding to an endpoint of the camera lens as related to a second position of driver component;
recording the second position of driver component as an endpoint; and
rotate the camera lens using the driver component between the origin and the endpoint, thereby adjusting the parameter of the camera lens to a predetermined value.

2. The method according to claim 1,
receiving a calibration signal for a preset duration, the calibration signal configured to select the driver component among a plurality of driver components.

3. The method according to claim 2, further comprising:
controlling the selected driver component for calibration in response to receiving a signal selecting a single driver component within the preset duration of the calibration signal.

4. The method according to claim 1, further comprising;
receiving a table correlating values of the parameters to be adjusted with positions of the driver component;
based on the parameters to be adjusted, reading corresponding rotational position information from the table; and
controlling the driver component to rotate the camera lens based on the corresponding rotational position information.

5. The method according to claim 1, the method further comprises:
detecting a range selection signal and selecting a third position;
detecting the range selection signal again and selecting a fourth position;
recording a range between the third position and the second fourth position; and
controlling the driver component to rotate within the recorded range.

6. The method according to claim 1, further comprises:
detecting a signal for magnifying a speed and sending a speed amplification signal to the driver component to control a rotation speed of the driver component; and
detecting a signal for reducing the speed and sending a speed reduction signal to the driver component to control a rotational precision of the driver component.

7. A camera lens control device, comprising:
a memory and one or more controllers,
the memory being configured to store at least one program, and
the controller configured to execute the method as described in claim 1 through executing the program.

8. The camera lens control device according to claim 7, further comprising:
a handwheel; and
a joystick,
the controller further configured to execute the method as described in claim 1 by sensing at least one of a rotation of the handwheel or a movement of the joystick.

9. A camera lens adjustment system, comprising a camera lens control device and at least one driver component, wherein the camera lens control device is configured to control the at least one driver component to execute the method as described in claim 1.

10. A computer-readable storage medium configured to store a computer program, wherein when the computer program is executed by a controller, it implements the method as described in claim 1.

11. A method for adjusting a camera lens, comprising
controlling a driver component configured to adjust a parameter of the camera lens;
obtaining information about a rotational position of the driver component; and
rotate the camera lens using the driver component based on the information, thereby adjusting the parameter of the camera lens to a predetermined value, wherein the controlling the driver component comprises controlling a plurality of driver components configured to adjust respective parameters of the camera lens, the method further comprising:
receiving a plurality of identifiers corresponding to the plurality of driver components, each of the plurality of driver components configured to adjust a corresponding type of parameter adjustment; and
searching for multiple driver components within a single channel to control the multiple driver components with an identical identifier in the same single channel, in response to receiving a manual signal.

12. The method according to claim 11, further comprising:
verifying an identifier of a selected driver component among the plurality of driver components;
controlling a rotation of the selected driver component, in response to the identifier matching the selected driver component corresponding to the parameters to be adjusted; and
changing the identifier of the selected driver component to match the parameters to be adjusted, in response to the identifier not matching a driver component corresponding to the parameters to be adjusted.

13. The method according to claim 12, wherein the changing the identifier of the selected driver component comprises:
reading a key for the driver component; and modifying the identifier of the selected driver component to match the parameters to be adjusted based on the key.

14. The method according to claim 13, wherein the selected driver component comprises multiple signal channels corresponding to different identifiers, further comprises:

modifying the multiple signal channels based on the identifier of the selected driver component to lower an electrical level in a corresponding channel, in response to the identifier not matching the parameters.

15. A method for adjusting a camera lens, comprising controlling a driver component configured to adjust a parameter of the camera lens;

obtaining information about a rotational position of the driver component; and rotate the camera lens using the driver component based on the information, thereby adjusting the parameter of the camera lens to a predetermined value, wherein the controlling the driver component comprises controlling a plurality of driver components configured to adjust respective parameters of the camera lens, the method further comprising:

assigning an address to each of the plurality of driver components; and controlling a corresponding driver component of the plurality of driver components through the assigned address in response to receiving an automatic signal.

* * * * *